United States Patent [19]

Inoue

[11] 4,383,159
[45] May 10, 1983

[54] METHOD OF AND APPARATUS FOR ELECTRICAL MACHINING WITH A VIBRATING WIRE ELECTRODE

[75] Inventor: Kiyoshi Inoue, Tokyo, Japan

[73] Assignee: Inoue-Japax Research Incorporated, Yokohama, Japan

[21] Appl. No.: 209,892

[22] Filed: Nov. 24, 1980

[30] Foreign Application Priority Data

Jan. 22, 1979 [JP] Japan ................................. 54-152248

[51] Int. Cl.³ ............................................. B23P 1/08
[52] U.S. Cl. .............................. 219/69 W; 219/69 V
[58] Field of Search ................ 219/69 W, 69 M, 69 V

[56] References Cited

U.S. PATENT DOCUMENTS 4,081,652  3/1978  Janicke et al. .................. 219/69 M

FOREIGN PATENT DOCUMENTS 2721804  12/1977  Fed. Rep. of Germany ... 219/69 W

*Primary Examiner*—C. C. Shaw
*Attorney, Agent, or Firm*—Karl F. Ross; Herbert Dubno

[57] ABSTRACT

A method of and an apparatus for the electrical machining of a conductive workpiece with an axially traveling wire-form electrode displaced transversely to the workpiece along a predetermined cutting path. A high-frequency mechanical vibration is imparted to the wire-form electrode and its amplitude is controlled as a function of the shape of the wire-cutting path.

8 Claims, 2 Drawing Figures

METHOD OF AND APPARATUS FOR ELECTRICAL MACHINING WITH A VIBRATING WIRE ELECTRODE

FIELD OF THE INVENTION

The present invention relates to electrical machining, e.g. electrical-discharge, electrochemical or electrochemical-discharge electroerosive machining of an electrically conductive workpiece with a continuous wire-form electrode, hereinafter also called a "wire" or a "wire electrode".

BACKGROUND OF THE INVENTION

In electrical machining of this type, of which the most typical form utilizes a succession of electroerosive electrical discharges and is commonly called "wire-cutting EDM" or "traveling-wire EDM", the wire electrode is continuously advanced from a supply side, e.g. in the form of a wire-supply reel, to a takeup side, e.g. in the form of a wire-takeup reel, through a machining zone in which the workpiece is positioned. The machining zone is flushed with a machining liquid, typically distilled water or a liquid dielectric (in electrical discharge machining or EDM) or a liquid electrolyte (in electrochemical machining or ECM), or a weakly conductive liquid electrolyte (in electrochemical-discharge machining or ECDM). The workpiece is juxtaposed with the axially traveling wire across the machining zone between a pair of guide members which serve to stretch the traveling wire for positioning it precisely in a predetermined machining relationship with the workpiece. A series of electrical pulses are applied across a machining gap formed between the workpiece and the traveling electrode to effect time-spaced electrical discharges at this gap to electroerosively remove material from the workpiece in the typical EDM mode of wire-cutting process. In the ECDM mode of a wire-cutting process, the electrolytic material solubilization is also utilized in addition to the EDM action. The ECM mode of operation utilizes a purely electrochemical action for the workpiece material removal process and may make use of a continuous DC current.

As material removal proceeds, the workpiece is displaced relative to and transversely to the continuously traveling wire electrode, typically under numerical control, along a predetermined path to generate a desired pattern of cut in the workpiece. The continuous advancement or travel of the wire is effected typically by traction drive rollers disposed at a location between the guide member on the downstream side and the wire takeup means. A desired tension is established in the traveling wire typically by providing brake rollers at a location between the guide member on the upstream side and the wire supply means.

It is known that the achievement of a satisfactory machining accuracy requires the use of a wire electrode as thin as 0.05 to 0.5 mm in diameter. This requirement has heretofore imposed restrictions in machining performance. Such a thin wire, given a desired tension, tends to be broken when arcing or short-circuiting with the workpiece takes place occasionally. Thus, the machining efficiency or removal rate hitherto achievable has been limited to an unsatisfactory level since the wire breakage is unavoidable when an enhancement of machining efficiency or an increase in the rate of relative displacement is attempted.

In my prior and copending U.S. patent application Ser. No. 60,346 filed July 25, 1979, now U.S. Pat. No. 4,321,450, divided from Ser. No. 796,369 filed May 12, 1977, now U.S. Pat. No. 4,205,213 issued May 27, 1980, it has been pointed out that these drawbacks are effectively eliminated or alleviated by imparting a vibration to the traveling wire electrode in the region of the machining gap and in a direction transverse to the axis of the traveling wire electrode, the vibration being of a frequency not lower than 100 Hz. The frequency of the vibration is preferably in a range between 1 and 50 kHz and the amplitude is preferably in a range between 1 and 5 microns or $\mu$m but may be as large as slightly smaller than the size of the machining gap, say 50 microns or $\mu$m. The vibration is imparted to the wire electrode in a direction, transverse to the axis of the traveling wire electrode so that an undulating oscillatory motion with more than two nodes and antinodes or loops is provided in the wire traveling between the two guide members positioned at opposite sides with respect to the workpiece. By imparting a vibration or undulating oscillatory motion to the wire electrode stretched and axially travelling between a pair of wire guide members, it appears that a pumping action is generated in the machining zone to facilitate removal or carrying-away therefrom of machined products, i.e. chips and gases and, of even more importance, a dispersive production of successive discharges in the machining zone over the entire workpiece thickness is assured, thus not permitting the discharges to be concentrated on a single point or region of the wire electrode traveling through the workpiece. It is also conceivable, though possibly less important, that the contact resistance on the guide members and other contact portion with the wire electrode is substantially reduced. Means for imparting the vibration to the traveling wire electrode is preferably in contact with a wire guide member for the electrode and may be an electromagnetic or a sonic or ultrasonic vibrator. The vibrator means may be a magnetostrictive or piezoelectric vibrator. A control system is preferably provided, in operation of the apparatus, to respond to the machining state in the gap and to cause a parameter of the vibration to be modified in response to the state. The vibrator means are preferably arranged to be cooled by a coolant fluid. In the use of the apparatus, the machining liquid is advantageously supplied to the wire by flowing through the location where the vibrating end of the vibrator arrangement comes in contact with the wire so that the heat generated at the vibrating body is sufficiently dissipated to avoid a detrimental heating of the wire electrode. It is also preferable to keep the plane of the wire vibration coincident with the direction of the relative displacement of the workpiece to the traveling wire electrode.

In my prior U.S. patent application Ser. No. 121,662 filed Feb. 15, 1980, now U.S. Pat. No. 4,358,655 issued Nov. 9, 1982 it has also been pointed out that the vibration is imparted to the traveling wire electrode preferably at two opposite locations on one and the other sides of the workpiece, respectively, the vibrations in the two locations being each in a direction transverse to the axis of the traveling wire electrode and of a frequency not lower than 100 Hz and preferably of different frequencies.

The vibrations are imparted at two locations opposed with respect to the workpiece to the wire electrode each in a direction transverse to the axis of the traveling wire electrode so that they are superimposed upon one another to create a composite undulating oscillatory motion with more than two nodes and anitnodes or loops in the wire traveling between the two guide members positioned at opposite sides with respect to the workpiece and each outside of each location at which the vibration is applied. By imparting a vibration to the traveling wire electrode at both sides of the workpiece through whichit is passed in a traveling-wire electroerosion system, it has been found that an enhanced improvement in the removal rate is attained, this being especially noticeable when workpieces of a greater thickness, say, more than 10 mm are machined. Thus, a much intensified pumping action appears to be generated in the machining zone to facilitate removal or carrying-away therefrom of machined products, i.e. chips and gases and, of even greater importance, a highly effective dispersive production of successive discharges in the machining zone over the entire workpiece thickness is assured, thus more favorably restraining the discharges from being concentrated on a single point or region of the wire electrode traveling through the workpiece. The vibrations imparted at the two opposed locations with respect to the workpiece are preferably of different frequencies, such that a beat or the periodic variation in amplitude of a wave, that is the superposition of the corresponding two simple harmonic waves of the different frequencies is produced in the traveling wire electrode. This arrangement has been found to be far more advantageous to facilitate and enhance the removal of machining chips and other gap products while suppressing the temperature rise of the machining workpiece.

The two vibration means are preferably positioned at their respective locations so as to provide the respective vibrations in directions transverse to each other, for example, one in the direction of x-axis and the other in the direction of y-axis, the axes along which the workpiece is displaced relative to the traveling wire electrode by the aforementioned displacement means, e.g. a numerically controlled drive means. Each of the vibrator means is preferably in contact with a wire guide member for the electrode and may be an electromagnetic or a sonic or ultrasonic vibrator. Each vibrator means may be a magnetostrictive or piezoelectric vibrator. The vibrators may be connected for energization with respective resonant circuits each connected across the machining gap. A control system is preferably provided, in operation of the apparatus, to respond to the machining gap and to cause a parameter of the vibrations to be modified in response to the gap state. The vibrator means are preferably arranged to be cooled by a coolant fluid. In the use of the apparatus, the machining liquid is advantageously supplied to the wire by flowing through the location where the vibrator end of each vibrator arrangement comes in contact with the wire or by flowing in contact with the body of each vibrator so that the heat generated at the vibrating body is sufficiently dissipated to avoid a detrimental heating of the wire electrode. It is also sometimes desirable to keep the plane of the wire vibration coincident with the direction of the relative displacement of the workpiece to the traveling wire electrode.

While a substantial improvement in machining performance is obtained by imparting a vibration or vibrations to the traveling wire electrode in the manner described, it has now been observed that this technique may entail a certain disadvantage especially in conjunction with the contour-machining feed or relative displacement required between the workpiece and the traveling wire electrode. Specifically, where the contour-machining path includes locations at which the direction of transverse advance of the vibrating wire electrode must be changed at any angle, an undesirable drop in the machining accuracy may occur at those locations on the workpiece.

OBJECTS OF THE INVENTION

It is, accordingly, an important object of the present invention to provide a method of electrically machining an electrically conductive workpiece with a vibrating wire electrode, which method yields an improved accuracy at a corner portion or those portions other than the rectilineal portions electroerosively machined by the vibrating wire electrode.

Another object of the invention is to provide an improved wire-cutting or traveling-wire electrical machining method which is capable of attaining an increased material removal rate with an extremely high cutting precision.

A further object of the invention is to provide an apparatus for electrical-machining an electrically conductive workpiece with a vibrating wire electrode, which apparatus is adapted to carry out the improved method.

SUMMARY OF THE INVENTION

These and other objects are attained, in accordance with the present invention, in a first aspect thereof, by a method of electrically machining an electrically conductive workpiece wherein a continuous wire-form electrode is axially transported from a supply side to a takeup side to continuously traverse the workpiece while defining a machining gap therewith supplied with a machining liquid; an electrical machining current is passed between the electrode and the workpiece to electroerosively remove material from the latter; a vibration is imparted to the wire-form electrode in the region of the machining gap transversely to the axis of the electrode; and the workpiece and the vibrating wire-form electrode are relatively displaced transversely to the axis of the electrode along a predetermined cutting path corresponding to a desired contour to be formed in the workpiece, the path including successive sections intersecting with an angle, the method comprising diminishing the amplitude of the vibration in the region of the intersection. In other words, the method comprises the step of controlling the amplitude of vibrations imparted to the wire-electrode, as a function of the shape of the wire-cutting path.

The invention provides, in a second aspect thereof an apparatus for electrical-machining an electrically conductive workpiece, having a continuous wire-form electrode adapted to be axially transported continuously from a supply side to a takeup side while continuously traversing the workpiece while defining a machining gap therewith supplied with a machining liquid; means for passing an electrical machining current between the workpiece and the wire-form electrode through the machining gap to electroerosively remove material from the workpiece; means for imparting a vibration to the wire-form electrode in the region of the machining gap transversely to the axis of the electrode; and machining feed means for relatively displacing the workpiece and the wire-form electrode transversely to the axis of the electrode along a predetermined path corresponding to a desired contour to be formed in the workpiece and including successive section intersecting with an angle, the apparatus comprising sensing means responsive to the machining feed means for detecting the wire-form electrode entering the region of a said intersection; and control means responsive to the sensing means for diminishing the amplitude of the vibration imparted to the wire-form electrode. Thus, the sensing means is responsive to the shape of the wire-cutting path and control means is adapted to control the amplitude of the vibrations imparted to the wire-form electrode as a function of the shape of the wire-cutting path.

BRIEF DESCRIPTION OF DRAWINGS

These and other objects, features and advantages of the present invention will become more readily apparent from the following description taken with reference to the accompanying drawings in which.

SPECIFIC DESCRIPTION

Figure 1:
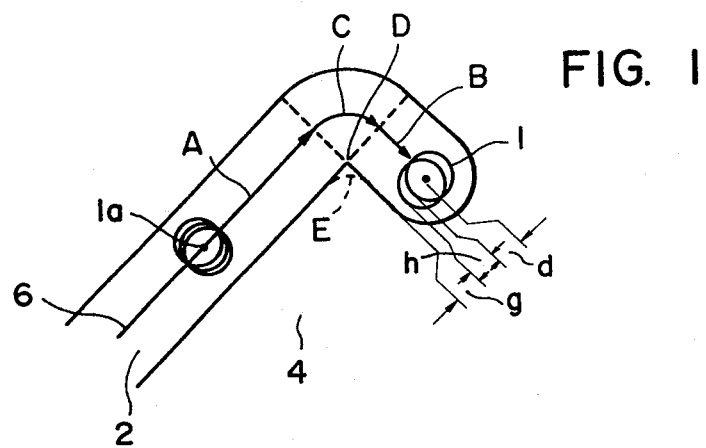
FIG. 1 is a schematic illustration representing the machining conditions which occur when the vibrating wire electrode moves relative to the workpiece along a path turning from one straight line to another with an angularity or along a curve.

FIG. 1 shows a schematic view illustrating a wire electrode 1 producing a cut 2 in a workpiece 4, taken from above in a plane perpendicular to the axis $1a$ of the wire electrode 1 which is caused to move, relative to the workpiece 4, along a predetermined cutting trajectory or path 6 dictated by preprogrammed NC (numerical control) commands. The cutting path 6 is shown including a section A which is rectilinear, a section B which is also rectilinear and a short curvilinear intermediate section C interconnecting the section A and B with an angularity. The wire electrode 1 is shown having a radius d and to be vibrated with an amplitude h transversely to the workpiece 4 and perpendicular to the path 6. A minimum gap spacing g is formed between each lateral surface of the vibrating wire electrode 2 and the opposed lateral surface or wall of the cut 2 electroerosively generated in the workpiece 4. As a result, both in sections A and B, each lateral surface of the cut 2 is formed at a distance $(d+h+g)$ from the wire axis $1a$ intersecting the cutting path axis 6. In the intermediate arc section C, the axis $1a$ of the wire electrode 1 must move, relative to the workpiece 4, along the path 6 turning around the center of arc or vertix D at a given speed. During this intermediate movement, the vibrating wire electrode must accordingly be held to be spaced from the point D at the distance g so that excess erosion at the region of the vertix D occurs and the corner or edge becomes undesirably rounded as shown at E. This phenomenon is peculiar to electrical machining with a vibrating wire electrode and is not found with an ordinary mechanical cutting tool. In electrical discharge machining, machining products, e.g. chips, may be trapped in the machining gap to bring about secondary discharges which are facilitated by the vibration of the wire electrode to produce an excessive erosion when a given workpiece site remains opposed to the electrode for an prolonged time duration. The excessive erosion or machining gap spacing is further expanded when an electrolytic solubilization is added.

The excess erosion at a corner portion or those portions other than straight paths is effectively eliminated or alleviated, in accordance with the present invention, by controlling the amplitude of a vibration imparted to the wire electrode 1 as a function of the shape of the wire-cutting path 6.

Figure 2:
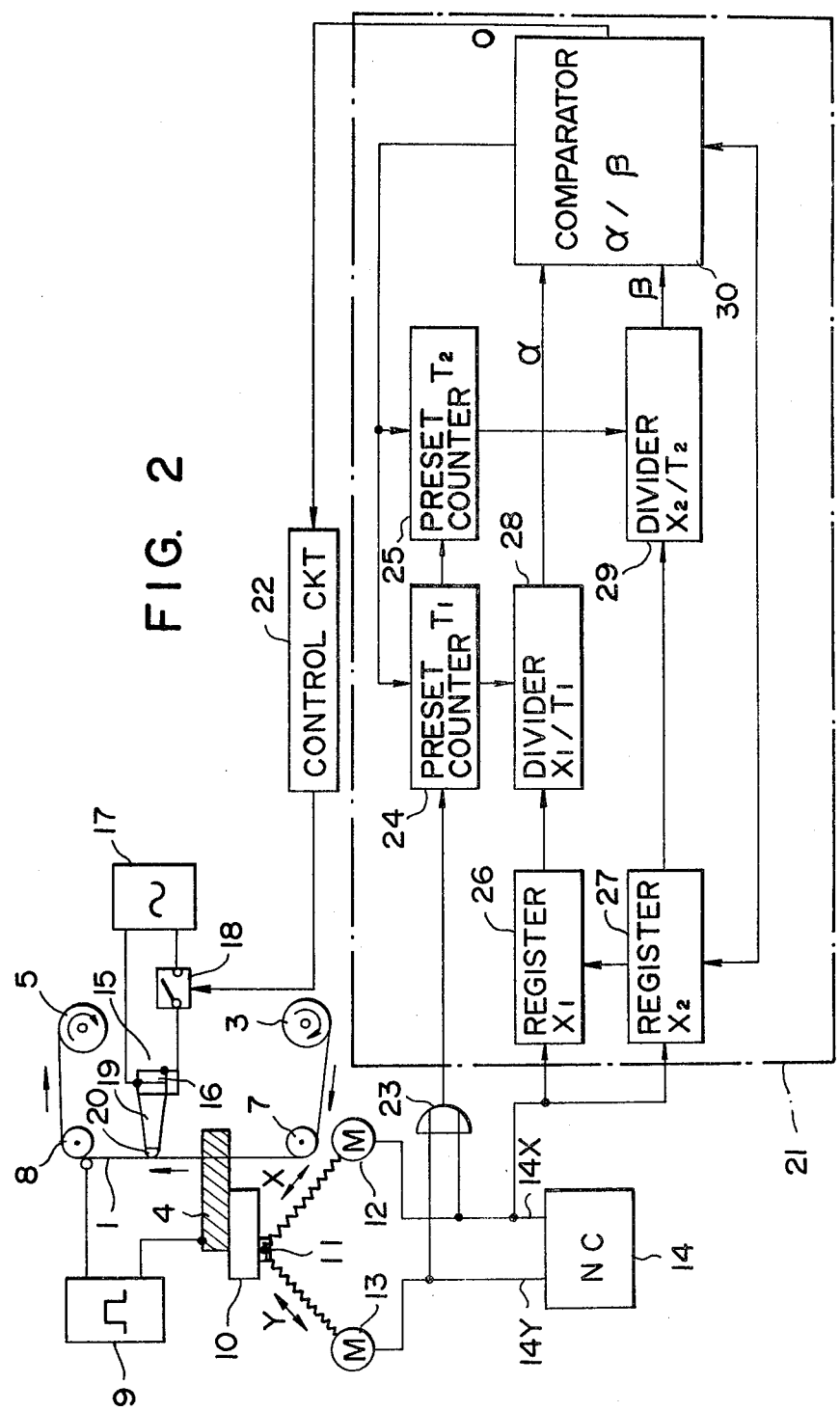
FIG. 2 is a schematic view diagrammatically illustrating a wire-cutting EDM apparatus embodying the principles of the present invention.

Referring to FIG. 2 which illustrates an embodiment of the present invention, a wire electrode 1 is shown to be fed from a supply reel 3 and wound on a takeup reel 5 while being supported and guided by a pair of support and guide members 7 and 8. The axial displacement of the wire electrode 1 is effected by means of a traction motor drive arrangement (not shown) provided downstream of the guide member 8 with a suitable brake mechanism (not shown) and being provided upstream of the guide member 7 to cause the wire 1 to travel under a controlled tension between the members 7 and 8 and through the machining gap formed between the wire electrode and a workpiece 4 juxtaposed therewith. One or more nozzles (not shown) are provided for supplying a machining liquid to the machining gap, across which a succession of electrical pulses are applied from a power supply, here shown by an EDM pulse generator 9, to effect successive machining discharges between the wire electrode 1 and the workpiece 4.

The workpiece 4 is secured on a worktable 10 carried on a cross-table arrangement 11 driven by a first motor 12, e.g. a stepping motor, for displacing the worktable 10 along an x-axis and a second motor 13, e.g. a stepping motor, for displacing the worktable 10 along a y-axis orthogonal to the x-axis, the first and second motors 12 and 13 being driven by electrical signals furnished by a numerical controller 14 to displace the workpiece 4 relative to the traveling-wire electrode 1 along a programmed cutting path 6 (FIG. 1).

Shown at 15 is a vibrator arrangement comprising an electromechanical transducer 16 connected to a high-frequency power supply 17 via a switch 18. The transducer 16 energized by the power supply 17 produces high-frequency oscillations therein which are amplified by a horn 19 and propagated therethrough to a tip 20 disposed in contact with or in close proximity to the traveling wire electrode 1 whereby to impart thereto the desired vibrations of a frequency in excess of 100 Hz and preferably in the range between 1 and 500 kHz and of a small amplitude, preferably between 1 and 50 microns. Thus, if an arc discharge or short-circuiting takes place in the machining gap, it can be extinguished mechanically by the high-frequency vibrations of the wire electrode 1; and contact friction over the guide members 7 and 8 is markedly reduced. Furthermore, the removal of machining products and gases produced in the machining gap which tend to disturb the machining stability is facilitated by the wire vibrations with the result that steady machining is continued with stability without breakage of the wire electrode and with an increased removal rate.

Preferably, two such vibrations are provided, one downstream of the machining region as shown and the other upstream thereof (not shown). The vibrations are thus advantageously imparted at two locations opposite with respect to the workpiece 4, to the wire electrode 1 each in a direction transverse to the axis of the traveling wire electrode so that they are superimposed upon one another to create a composite undulating oscillatory motion with more than two nodes and antinodes or loops in the wire traveling between the two guide members 7 and 8 positioned at opposite sides with respect to the workpiece 4 and each outside of each location at which the vibration is applied.

The vibration of a wire is generally dictated by the equation:

$$F = \frac{n}{2L} \sqrt{\frac{Pg}{\gamma}}$$

Where F: the frequency, n: the node number, L: the distance between supporting points, P: the tension, g: the gravitational acceleration, and $\gamma$: the weight of unit mass of the wire. It is seen than the vibration occurs in a number of possible modes as a function of the frequency. For example, with a copper wire of 0.2 mm diameter, $\gamma = 2.8 \times 10^{-6}$ kg/cm$^3$ and, when P=800 grams, the frequency F=840 Hz can be given for L=10 cm. For L=1 cm, F=8.4 kHz; for L=0.28 cm, F=30 kHz; and for L=0.14 cm, F=60 kHz. Thus, given a constant L, a vibration of desired wave length can be developed by varying the frequency which causes a proportional change of the node number. It can accordingly be seen that for a thinner workpiece, it is advantageous to provide a vibration of greater frequency or higher node number. Electrical machining discharges develop preferentially at antinode or loop portions of the vibrating wire electrode. The increase of the node number thus results in an increase of the number of electrical machining discharges which are created. The increase in the node number also causes the decrease in the vibration amplitude which results in the reduction of the cutting clearance in the workpiece. Furthermore, it facilitates the removal of machining products from the gap region.

The vibrations when imparted to the two locations opposed with respect to the workpiece 4 are preferably of different frequencies such that a beat or the periodic vibration in amplitude of a wave that is the superimposition of the corresponding two simple harmonic waves of the different frequencies is produced in the traveling wire electrode 1. This arrangement has been found to be very advantageous in that it facilitates and enhances the removal of machining chips and other gap products while suppressing the temperature rise of the machining workpiece 4.

The numerical controller 14 has a magnetic tape or any other recording medium on which the information preprogrammed for the cutting path 6 (FIG. 1) is stored. A suitable reproduction means is provided to read out the information and to regenerate feed signals which are applied to pulse distributor circuits designed to distribute clock pulses from a time base into x- and y-component drive pulses and to apply them to the stepping motors 12 and 13, respectively, whereby to displace the workpiece 4 so that the axis 1a of the wire electrode effectively moves along the desired cutting path 6.

In accordance with the principles of the present invention, there is provided a sensing circuit unit 21 for detecting the shape of wire-cutting path 6, and a control circuit unit 22 responsive to the sensing circuit unit 21 for controlling the on-off operation of the switch 18 connecting the transducer 16 to the energizing power supply 17, thereby controlling the amplitude of the vibrations imparted to the wire electrode 1 as a function of the shape of the wire-cutting path 6.

The sensing circuit unit 21 inclludes an OR gate 23 having inputs connected to the x-component drive pulse output 14x and y-component drive pulse output 14y of the numerical controller 14 for reconverting the distributed x-component drive pulses and y-component drive pulses into a uniform train of pulses which are counted by two preset counters 24 and 25, the counter 25 counting overflow counts from the counter 24. Further counters (registers) 26 and 27 having their inputs both connected to the x-component drive pulse output 14x have their outputs connected to dividers 28 and 29, respectively. The divider 28 is used to compare a number N1 of x-component drive pulses X1 counted by the counter 26 with the preset count T1 of the counter 24 to provide an output signal representing X1/T1=$\alpha$ and the divider 29 is used to compare a number N2 of x-component drive pulses X2 counted by the counter 27 with the preset count T2 of the counter 25 to provide an output signal representing X2/T2=$\beta$. A comparator 30 constituted by a coincident circuit is connected to the outputs of the dividers 28 and 29 to compare the values $\alpha$ and $\beta$. The comparator 30 provides a "1" output signal when $\alpha=\beta$ and an "0" output signal when $\alpha \neq \beta$. The binary output signals of the comparator 30 are fed to the control circuit 22 which in turn thereby controls the on-off operation of the switch 18. Then the counters 24, 25, 26 and 27 are cleared and recommence counting.

Figure 3:
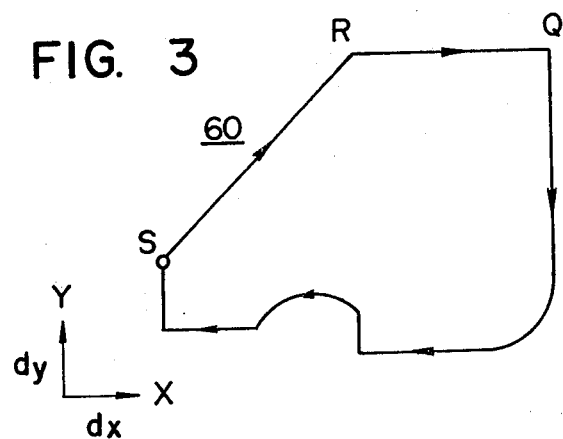
FIG. 3 is a schematic illustration of a wire-cutting electrical-contour-machining path including various turning points.

Let it be assumed that the wire-cutting EDM operation is to proceed along a cutting path 60 as shown in FIG. 3, the path having a start point S. In the initial section, the axis of the wire electrode 1 is displaced (relative to the workpiece) along a rectilinear path SR under the command of the numerical controller 14 distributing drive pulses into x-axis and y-axis components accordingly. At point R, the path is caused to turn and then becomes rectilinear. This rectilinear section continues until the of point Q is reached. In the successive displacements, the axis of the wire electrode 1 is stepped to move dx, −dx, dy or −dy per one incremental drive pulse. In the section SR, the ratio $\Sigma dx/\Sigma(dx+dy)$ is always constant because the path is rectilinear. All of the driver pulses furnished to the motors 12 and 13 from the numerical controller 14 are applied through the OR gate 23 to the counters 24 and 25 for counting thereby. The x-component drive pulses furnished to the motor 12 are counted by the counters 26 and 27. The counter 24 counts a total number T1 of x- and y-component drive pulses until the N1-th pulse and the counter 26 counts a total number X1 of x-component drive pulses. The counter 25 counts a total number T2 of x- and y-component drive pulses until the N2-th pulse and the counter 27 counts a total number T2 of x-component drive pulses (N2>N1, T2>T1). In the section SR, the ratio X1/T1=$\alpha$ is equal to X2/T2=$\beta$. The comparator 30 then furnishes the "1" output which permits the control circuit 22 to turn or hold on the switch 18 so that the wire electrode remains vibrated whereby to allow cutting to proceed with an enhanced removal rate and stability.

In the region of the point R, the ratio $\Sigma dX/\Sigma(dX+dY)$ changes. Specifically, the number of dY diminishes and eventually becomes nil to cause the proportion of $\Sigma dX$ of $\Sigma(dx+dy)$ to increase. Since $\beta$ thus deviates from $\alpha$, the comparator 30 now furnishes "0" output which is applied to the control circuit 22 to turn the switch 18 off, thereby halting the vibrations imparted to the wire electrode 1.

After passage over point R, the cutting path becomes again rectilinear until the region of point Q is reached. In this section in which the path is in parallel with the Y-axis, $\Sigma dY=0$, $T1=X1$ and $T2=X2$ so that $\alpha=\beta$. The comparator 30 then furnishes again the "1" output signal which is applied to the control circuit 22 to turn the switch 18 on, thereby recommencing the vibrations of the wire electrode 1. When the path approaches point Q, the switch 18 is turned off to again halt the vibrations.

In this manner, the excessive erosion at corner portions described in connection with FIG. 1 is practically eliminated by terminating the vibrations to the wire electrode in response to a change in the advance direction of the wire-cutting path or a change in the tangential to the cutting path. It thus becomes possible to machine even a highly complicate pattern contour with a due precision. Sometimes, it may be sufficient and satisfactory to reduce the vibration amplitude rather than completely halting the vibrations. Furthermore, the amplitude of the vibrations may be varied as a function of the curvature of the wire-cutting path. In addition to the vibration amplitude control, the power supply 9 may be subject to control by the control-circuit unit 22 so that the power-supply output voltage, the pulse peak current Ip and duration $\tau$ on may also be modified as represented by line 22a.

There is thus provided an improved method as well as an apparatus for electrical-machining an electrically conductive workpiece whereby a desired machining operation is permitted to proceed with stability while yielding an extremely high cutting precision and efficiency.

What is claimed is:

1. In an apparatus for electrical-machining an electrically conductive workpiece, having a continuous wire-form electrode adapted to be axially transported continuously from a supply side to a takeup side while continuously traversing the workpiece and defining a machining gap therewith supplied with a machining liquid; power supply means for passing an electrical machining current between the workpiece and the wire-form electrode through the machining gap to electroerosively remove material from the workpiece; means for imparting a vibration to the wire-form electrode in the region of the machining gap transversely to the axis of the electrode; and machining feed means for relatively displacing the workpiece and the wire-form electrode transversely to the axis of the electrode along a predetermined cutting path corresponding to a desired contour to be formed in the workpiece, the improvement which comprises control means for controlling the amplitude of the vibration imparted to the wire-form electrode as a function of the shape of said cutting path, and sensing means operatively connected to said machining feed means for providing a sensing signal representing the shape of said cutting path, said control means being responsive to said sensing signal for controlling the amplitude of the vibration imparted to the wire-form electrode.

2. The improvement defined in claim 1 wherein said path includes successive rectilinear sections intersecting with an angle, said sensing means being responsive to the arrival of the path in the region of said intersection to provide said sensing signal.

3. The improvement defined in claim 2 wherein said control means is responsive to said sensing signal for diminishing the amplitude of said vibration.

4. The improvement defined in claim 1 wherein said sensing means is responsive to a change in the curvature of said path.

5. The improvement as defined in claim 1, further comprising means associated with said power supply means for controlling at least one parameter of said electrical machining current in response to said sensing signal.

6. The improvement defined in claim 1 wherein said machining feed means includes a numerical controller pre-programmed with said path, and motors driven by said controller for displacement along at least two mutually perpendicular axes, said sensing means including pulse-counting means operatively connected to said control means for vibration-amplitude control, said pulse-counting means being responsive to pulses transmitted to said motors by said numerical controller.

7. The improvement defined in claim 6 wherein said sensing means further includes an OR gate receiving pulses applied to said motors by said numerical controller, said pulse-counting means including a first counter responsive to said OR gate, further counters connected to receive pulses applied to said motors by said numerical controller, and respective dividers forming quotients of the counts of the further counter by the count of said first counter.

8. The improvement defined in claim 7 wherein said sensing means includes a comparator responsive to the quotients for operating said control means.

* * * * *